United States Patent

Takata

(10) Patent No.: US 11,024,857 B2
(45) Date of Patent: Jun. 1, 2021

(54) SURFACE TREATMENT METHOD AND SURFACE TREATMENT APPARATUS OF FUEL CELL SEPARATOR

(71) Applicant: TOYOTA JIDOSHA KABUSHIKI KAISHA, Toyota (JP)

(72) Inventor: Satoshi Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 16/377,425

(22) Filed: Apr. 8, 2019

(65) Prior Publication Data

US 2019/0348686 A1    Nov. 14, 2019

(30) Foreign Application Priority Data

May 14, 2018    (JP) .............................. JP2018-092918

(51) Int. Cl.
*H01M 8/0208*    (2016.01)

(52) U.S. Cl.
CPC ................................ *H01M 8/0208* (2013.01)

(58) Field of Classification Search
CPC .................................................. H01M 8/0208
See application file for complete search history.

(56) References Cited

U.S. PATENT DOCUMENTS

| 2004/0081881 A1* | 4/2004 | Vyas ......................... C25B 9/10 |
| | | 429/509 |
| 2007/0298309 A1 | 12/2007 | Vyas et al. |
| 2008/0075998 A1* | 3/2008 | Ishihara .............. H01M 8/1246 |
| | | 429/490 |
| 2013/0230072 A1* | 9/2013 | Couse ............... H01M 8/04664 |
| | | 374/5 |
| 2017/0069928 A1* | 3/2017 | Ichihara .............. B32B 37/1292 |

FOREIGN PATENT DOCUMENTS

| JP | 2002-146536 A | 5/2002 |
| JP | 2008-021647 A | 1/2008 |
| JP | 2008-091101 A | 4/2008 |

\* cited by examiner

*Primary Examiner* — Jimmy Vo
(74) *Attorney, Agent, or Firm* — Sughrue Mion, PLLC

(57) ABSTRACT

A surface treatment method of a fuel cell separator capable of suppressing temperature unevenness of the fuel cell separator is provided. In the surface treatment method, an antimony-doped tin oxide (ATO) film is formed on a surface of a fuel cell separator (W1) used for a fuel cell. The fuel cell separator (W1) is heated using a high-frequency induction heating method (S1). By spraying solution (L1) including antimony and tin onto the fuel cell separator (W1), the ATO film is caused to be formed on the surface of the fuel cell separator (W1) (S2).

3 Claims, 4 Drawing Sheets

SURFACE TREATMENT METHOD AND SURFACE TREATMENT APPARATUS OF FUEL CELL SEPARATOR

CROSS REFERENCE TO RELATED APPLICATIONS

This application is based upon and claims the benefit of priority from Japanese patent application No. 2018-092918, filed on May 14, 2018, the disclosure of which is incorporated herein in its entirety by reference.

BACKGROUND

The present disclosure relates to a surface treatment method and a surface treatment apparatus of a fuel cell separator.

Japanese Unexamined Patent Application Publication No. 2002-146536 discloses a surface treatment method in which a tin oxide film is formed by a spray thermal decomposition method while heating a glass substrate using a heater.

SUMMARY

The aforementioned surface treatment method is applied to a film-forming method in which a tin oxide film is formed on a surface of a fuel cell separator substrate. However, the fuel cell separator substrate is often made of a metallic material and is thinner than the aforementioned glass substrate. Further, warpage often occurs in the fuel cell separator substrate when it is heated. Due to this warpage, the distances between the respective parts of the fuel cell separator substrate and the surface of the heater vary depending on the positions of the fuel cell separator substrate. Therefore, it is possible that the fuel cell separator substrate may not be uniformly heated and thus temperature unevenness may occur. It is possible that this temperature unevenness may affect crystallinity of the tin oxide film and cause the electrical conductivity to be reduced.

The present disclosure prevents temperature unevenness of the fuel cell separator.

A surface treatment method of a fuel cell separator according to the present disclosure is a surface treatment method in which an antimony-doped tin oxide film (ATO film) is formed on a surface of a fuel cell separator used for a fuel cell, the method including: heating the fuel cell separator using a high-frequency induction heating method; and causing the ATO film to be formed on the surface of the fuel cell separator by spraying solution including antimony and tin onto the fuel cell separator.

According to the aforementioned configuration, due to the use of the high-frequency induction heating method, the fuel cell separator is self-heated, and the temperatures of the respective parts of the fuel cell separator uniformly increase. Therefore, even when the fuel cell separator warps due to the increase in the temperature, there is no substantial difference in the temperatures of the respective parts of the fuel cell separator, and temperature unevenness of the fuel cell separator can be prevented. It is therefore possible to prevent the crystallinity of the ATO film from being reduced and to prevent electrical conductivity of the ATO film from being reduced.

Further, when the solution including antimony and tin is sprayed, the temperature of the fuel cell separator may be within a range from 350° C. or higher to 550° C. or lower.

According to the aforementioned configuration, the ATO film with higher crystalline can be formed, and contact resistance can be suppressed within a predetermined range.

Further, in the high-frequency induction heating method, a high-frequency induction coil having a pancake-like shape may be used.

According to the aforementioned configuration, the distances between the high-frequency induction coil and the respective parts of the fuel cell separator are uniform, whereby it is possible to increase the temperatures of the respective parts of the fuel cell separator further uniformly. Therefore, it is possible to further suppress temperature unevenness of the fuel cell separator.

A surface treatment apparatus of a fuel cell separator according to the present disclosure is a surface treatment apparatus of a fuel cell separator in which an antimony-doped tin oxide film (ATO film) is formed on a surface of a fuel cell separator used for a fuel cell, the apparatus including: a high-frequency induction heating coil configured to heat the fuel cell separator; and a nozzle configured to spray solution including antimony and tin onto the fuel cell separator, in which the ATO film is caused to be formed on the surface of the fuel cell separator by the spray using the nozzle.

According to the aforementioned configuration, due to the use of the high-frequency induction heating coil, the fuel cell separator is self-heated, and the temperatures of the respective parts of the fuel cell separator are uniformly increased. Even when the fuel cell separator warps due to the increase in the temperature, it is possible to prevent the temperature unevenness of the fuel cell separator.

According to the present disclosure, it is possible to suppress temperature unevenness of the fuel cell separator.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The specific embodiment to which the present disclosure is applied will be described hereinafter in detail with reference to the drawings. It should be noted, however, that the present disclosure is not limited to the following embodiment. Besides, the following description and drawings are simplified as appropriate for the sake of clarification of explanation.

First Embodiment

Figure 1:
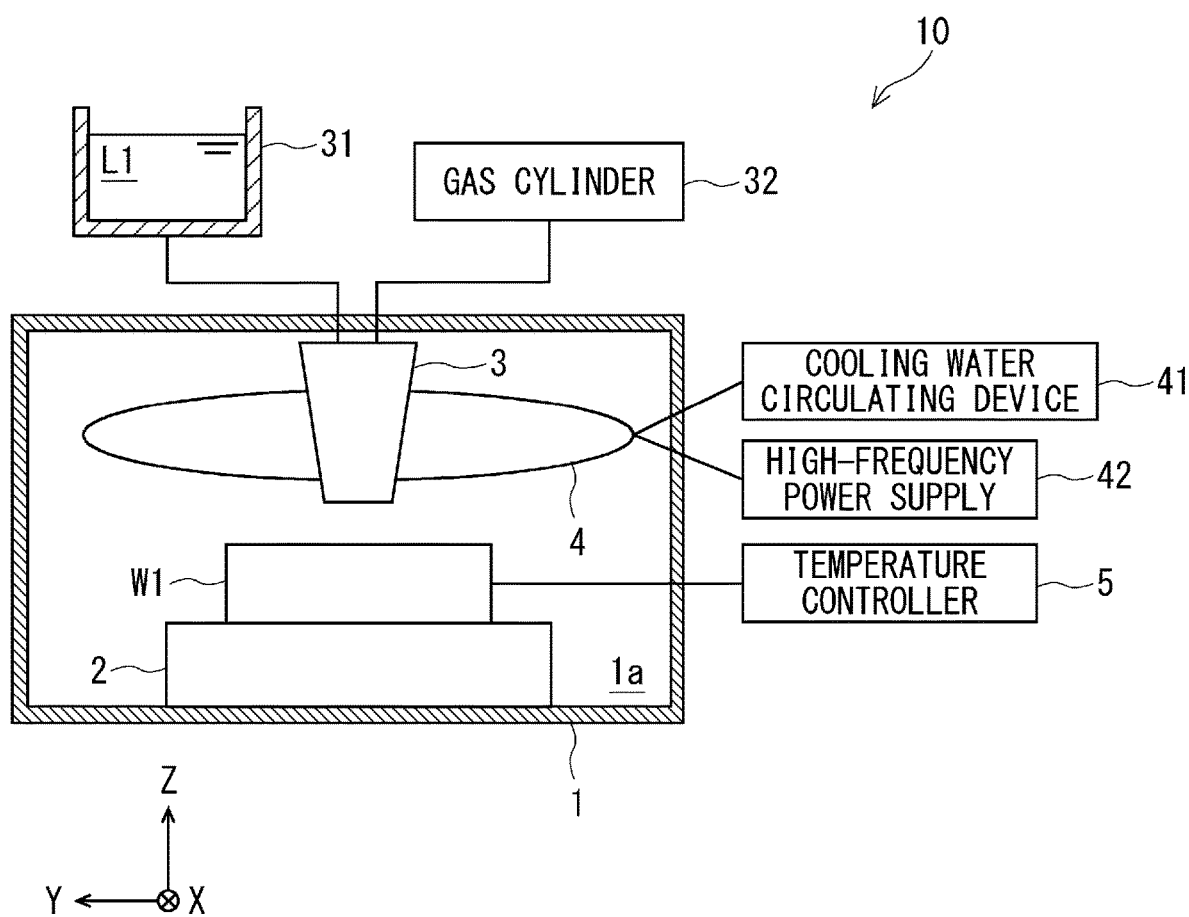
FIG. 1 is a schematic view showing a surface treatment apparatus according to a first embodiment.

Referring to FIG. 1, a surface treatment apparatus according to a first embodiment will be explained. FIG. 1 is a schematic view showing a surface treatment apparatus according to the first embodiment. As a matter of course, the right-handed xyz-coordinate system shown in FIG. 1 and the other drawings is used for the sake of convenience to illustrate a positional relationship among components. In general, as is common among the drawings, a positive direction along a z-axis is a vertically upward direction, and an xy-plane is a horizontal plane.

As shown in FIG. 1, a surface treatment apparatus 10 includes a film forming chamber 1, a substrate holding table 2, a nozzle 3, and a coil 4.

The substrate holding table 2, the nozzle 3, and the coil 4 are arranged in an inner space 1a of the film forming chamber 1. The film forming chamber 1 may include a door (not shown) in order to carry in or carry out a workpiece W1. The film forming chamber 1 may have a predetermined sealing property in such a way that the inner atmosphere is able to have an oxygen partial pressure lower than that of the outside air.

The substrate holding table 2 holds the workpiece W1. The substrate holding table 2 may include an apparatus for conveying the workpiece W1 as appropriate.

The substrate holding table 2 is, for example, a flat plate-like body made of a predetermined material. Various types of materials such as ceramics, an electrically conductive material, or an insulating resin may be used as the material.

When the electrically conductive material is used as the aforementioned material, the substrate holding table 2 is self-heated by high-frequency induction heating. Therefore, in this case, the substrate holding table 2 is preferably cooled by water. This is because, by cooling the substrate holding table 2 by water, heat due to self-heating of the substrate holding table 2 is deprived of, which prevents the temperature increase in the substrate holding table 2.

When the insulating resin is used as the aforementioned material as well, heat transfers from the workpiece W1 to the substrate holding table 2, and the insulating resin of the substrate holding table 2 is thermally decomposed easily. Therefore, in this case, the substrate holding table 2 is preferably cooled by water. This is because, by cooling the substrate holding table 2 by water, the insulating resin of the substrate holding table 2 is not likely to be thermally decomposed, which can prevent the workpiece W1 from being contaminated by the thermal decomposition.

When the ceramics is used as the aforementioned material, there is hardly any risk that the temperature of the substrate holding table 2 may increase and the workpiece W1 may be contaminated since ceramics includes a property of insulating electricity and is thus not likely to be self-heated by high-frequency induction heating. That is, even when the substrate holding table 2 is not cooled by water, there is no risk that the temperature of the substrate holding table 2 may increase and the workpiece W1 may be contaminated. Therefore, ceramics is preferably used as the aforementioned material since in this case the apparatus or the like for cooling the substrate holding table 2 by water may be omitted and the surface treatment can be performed while the configuration of the surface treatment apparatus 10 is kept simple.

The workpiece W1 is a fuel cell separator substrate made of a predetermined material. The aforementioned material may be various types of materials, and may be, for example, pure Ti, pure Al, an alloy thereof, or stainless steel. The thickness of the workpiece W1 may be, for example, set to a range in which the workpiece W1 warps by heating, and may be, for example, 0.1 mm. Further, the thickness of the workpiece W1 is preferably small since the fuel cell stack includes a larger number of fuel cell separators and performance of the fuel cell can be improved.

Further, when an antimony-doped tin oxide film (ATO film) is formed in a surface treatment method described later, insulating oxides tend to be generated more in the workpiece W1 made of stainless steel than those in the workpiece W1 made of pure Ti but the manufacturing cost of the workpiece W1 made of stainless steel tends to be lower than that of the workpiece W1 made of pure Ti. The workpiece W1 made of stainless steel is preferably used since when the oxygen partial pressure in the inner space 1a of the film forming chamber 1 is decreased in the surface treatment method described later, occurrence of insulating oxides may be prevented.

The nozzle 3 is made of a predetermined material. Various types of materials such as ceramics, an electrically conductive material, or an insulating resin may be used as the aforementioned material.

When the electrically conductive material is used as the aforementioned material, the nozzle 3 is preferably cooled by water since the nozzle 3 is self-heated by high-frequency induction heating of the coil 4. This is because, by cooling the nozzle 3 by water, heat due to this self-heating is deprived of, which prevents the temperature increase in the nozzle 3.

Further, when the insulating resin is used as the aforementioned material, the nozzle 3 is heated by radiant heat from the workpiece W1 and is thermally decomposed, which tends to contaminate the workpiece W1. Therefore, in this case, the nozzle 3 is preferably cooled by water. This is because, by cooling the nozzle 3, the nozzle 3 is not likely to be thermally decomposed and it is possible to prevent the workpiece W1 from being contaminated by the thermal decomposition.

Further, when ceramics is used as the aforementioned material, even when the substrate holding table 2 is not cooled by water, there is no risk that the temperature of the nozzle 3 may increase and the workpiece W1 may be contaminated. Therefore, ceramics is preferably used as the aforementioned material since the use of ceramics may make the configuration of the surface treatment apparatus 10 simple.

The nozzle 3 is connected to a tank 31 and is supplied with a spray liquid L1. The nozzle 3 is also connected to a gas cylinder 32 and is supplied with spray gas. The nozzle 3 sprays this spray gas to blow the spray liquid L1. The tank 31 stores the spray liquid L1. While the surface treatment apparatus 10 shown in FIG. 1 includes one nozzle 3, the surface treatment apparatus 10 may include a plurality of nozzles 3 depending on the surface area or the like of the workpiece W1.

The spray liquid L1 may be any type of solution as long as it includes antimony and tin, and may be, for example, ethanol solution including tin tetrachloride ($SnCl_4$) and antimony pentachloride ($SbCl_5$). Various types of solvents such as ethanol may be used as a solvent of the spray liquid L1. The reason why ethanol is preferably used is that, since it is an organic solvent, oxides and hydroxides are less likely to be precipitated than in water. Compared to many other organic solvents, ethanol has a smaller molecular weight, there is a low risk that organic substances generated due to a thermal decomposition reaction may contaminate the antimony-doped tin oxide (ATO) film, and electrical conductivity of the ATO film is not likely to be reduced. Further, ethanol is less toxic than methanol.

A tin compound and an antimony compound may be used as a solute of the spray liquid L1.

The aforementioned tin compound may be tetravalent, which is the same as the valence of tin of the ATO film, and may be, for example, organic tin such as tetrabutyl.

Further, the aforementioned antimony compound may be pentavalent, which is the same as the valence of antimony of the ATO film, and may be, for example, sodium antimonate or antimony potassium tartrate.

The gas cylinder 32 stores spray gas. The spray gas may be, for example, nitrogen gas, dry air, the atmosphere or the like. Nitrogen gas is preferably used since the workpiece W1 is not likely to be oxidized and the electrical conductivity is not likely to be reduced compared to a case in which dry air, the atmosphere or the like is used. When the atmosphere is used, a compressor may be connected to the nozzle 3, and the atmosphere may be supplied from this compressor to the nozzle 3. In this case, a solid-matter removal filter is preferably provided between the compressor and the nozzle 3 since it is possible to prevent suspended solids in the atmosphere from contaminating the ATO film.

The coil 4 is a high-frequency induction coil made of pure copper or copper alloy. The coil 4 includes a hollow part, and this hollow part includes an inlet, an outlet, and a flow path that communicates from the inlet to the outlet. While the coil 4 may have various types of shapes, the coil 4 has a pancake-like shape in one example of the coil 4 shown in FIG. 2. The coil 4 is arranged in such a way that it is opposed to the substrate holding table 2. The nozzle 3 is arranged in such a way that it is opposed to the substrate holding table 2, and may be arranged in the vicinity of the central part of the principal surface (in this example, the surface that is substantially parallel to the XY plane) of the coil 4.

The coil 4 is connected to a cooling water circulating device 41, which circulates cooling water in the coil 4. Specifically, the hollow part of the coil 4 receives the cooling fluid from the inlet, this cooling fluid is led to the outlet by this flow path, and is then discharged from this outlet. This cooling fluid draws heat from the coil 4 while it passes through the inlet, the flow path, and the outlet.

The coil 4 is connected to a high-frequency power supply 42 via a high-frequency converter or the like as appropriate. The coil 4 is supplied with an alternating current based on power from the high-frequency power supply 42. When the coil 4 is supplied with an alternating current, the workpiece W1 is self-heated by high-frequency induction.

One example of the surface treatment apparatus 10 shown in FIG. 1 further includes a temperature controller 5. The temperature controller 5 includes a sensor configured to measure the temperature of the workpiece W1. Further, the temperature controller 5 may send a command signal to each of the components of the surface treatment apparatus 10 such as the cooling water circulating device 41 or the high-frequency power supply 42 in accordance with the temperature of the workpiece W1 in such a way that the temperature of the workpiece W1 is maintained to be within a target range.

(One Specific Example of Coil)

Figure 2:
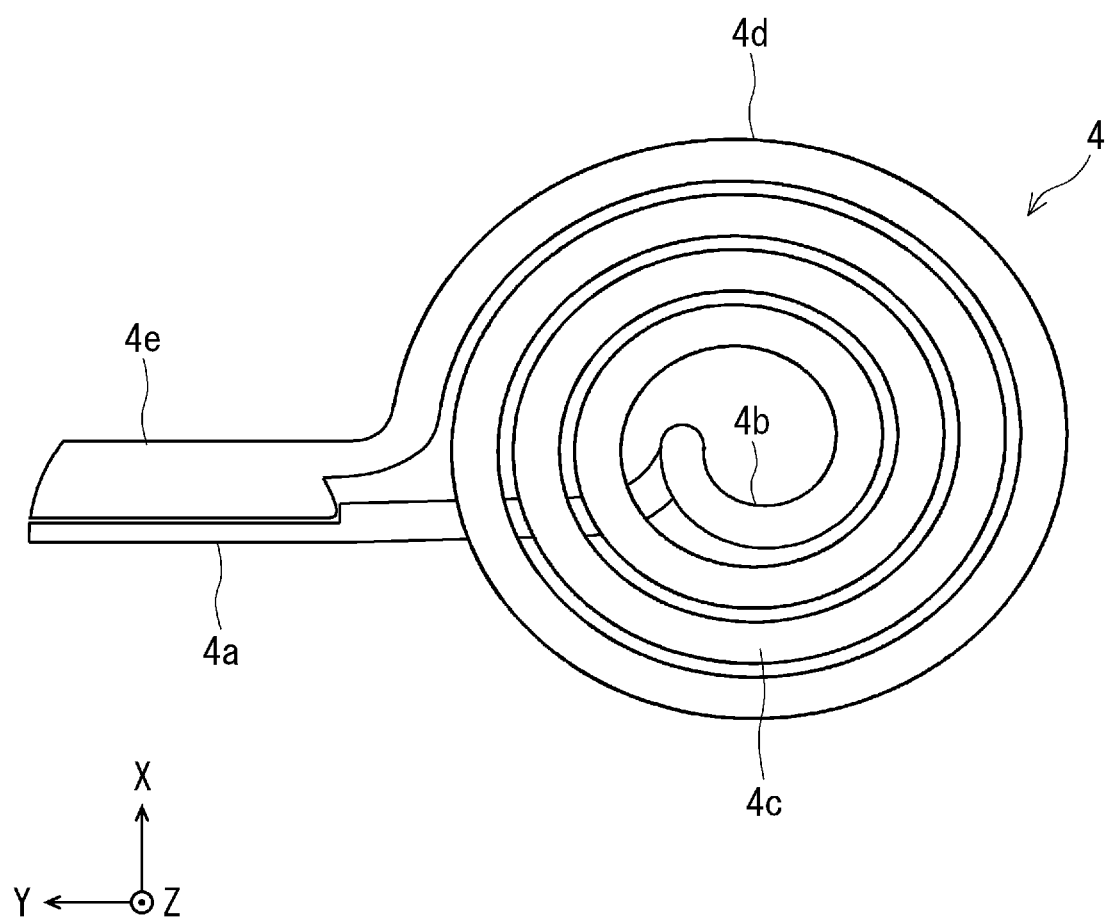
FIG. 2 is a top view showing one specific example of a coil of the surface treatment apparatus according to the first embodiment.

Referring next to FIG. 2, one specific example of the coil 4 will be explained. FIG. 2 is a top view showing one specific example of the coil of the surface treatment apparatus according to the first embodiment.

As shown in FIG. 2, one specific example of the coil 4 is a pancake-shaped high-frequency induction heating coil. One specific example of the coil 4 is one tubular body including a spiral part 4c wound in a spiral shape, and this tubular body is made of copper. The spiral part 4c has a single layer or a plurality of layers. As shown in FIG. 2, the coil 4 includes one end 4a, the spiral part 4c, and another end 4e. The coil 4 is a tubular body that is linearly extended from one end 4a to a central part 4b of the spiral part 4c, wound one or more times in a spiral manner from the central part 4b to an outer edge part 4d of the spiral part 4c, and is extended along a straight line from the outer edge part 4d to the other end 4e. The other end 4e and the one end 4a are linearly extended along a straight line.

One specific example of the coil 4 includes the spiral part 4c, which has a shape that is close to a substantially disc-shaped body. Incidentally, coils typically have shapes other than a pancake-like shape, and have, for example, round (cylindrical) shapes or conical shapes. Since one specific example of the coil 4 includes the spiral part 4c, this coil has a shape that corresponds to the plane of the workpiece W1, unlike the aforementioned typical coils. The distances between the respective parts of the coil 4 of one specific example and the workpiece W1 do not substantially vary from each other regardless of the parts of the coil 4, and are substantially constant. Therefore, compared to the aforementioned typical coils, one specific example of the coil 4 is able to heat the workpiece W1 by high-frequency induction heating further uniformly.

The nozzle 3 is preferably arranged in the vicinity of the central part 4b of the coil 4. When the coil 4 is opposed to the workpiece W1 and the workpiece W1 is heated by high-frequency induction heating, the temperature of the part of the workpiece W1 that is opposed to the central part 4b of the coil 4 tends to become the highest. The nozzle 3 is preferably arranged in the vicinity of the central part 4b of the coil 4 since it is then possible to spray the spray liquid L1 onto the part of the workpiece W1 that is opposed to the central part 4b of the coil 4 and the temperatures of the respective parts of the workpiece W1 may be made uniform.

The cooling water circulating device 41 supplies cooling water to one of the one end 4a and the other end 4e of the coil 4, and the cooling water may be discharged from the other one of the one end 4a and the other end 4e of the coil 4, whereby the cooling water may be circulated.

(Surface Treatment Method)

Figure 3:
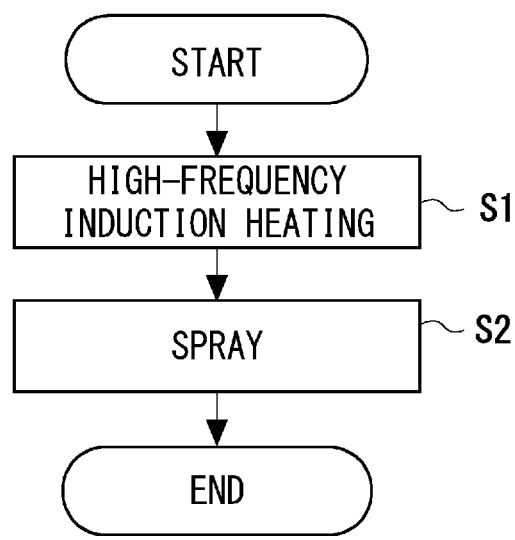
FIG. 3 is a flowchart showing a surface treatment method according to the first embodiment.

Referring next to FIGS. 1 to 3, a surface treatment method according to the first embodiment will be explained. FIG. 3 is a flowchart showing the surface treatment method according to the first embodiment. In this surface treatment method, the surface treatment apparatus 10 can be used.

First, after the workpiece W1 is placed on the substrate holding table 2, the workpiece W1 starts to be heated using a high-frequency induction heating method, the temperature of the workpiece W1 is increased to be within a predetermined range, and then this temperature is maintained (high-frequency induction heating step S1). The predetermined range is, for example, 350° C.-550° C.

Specifically, the cooling water is circulated through the coil 4 by the cooling water circulating device 41. After that, the alternating current based on the power of the high-frequency power supply 42 is made to flow through the coil 4. Then high-frequency induction heating is started, and the temperature of the workpiece W1 increases and reaches a predetermined range. The workpiece W1 may warp due to the increase in the temperature. Due to the warpage of the workpiece W1, the workpiece W1 becomes a plate-shaped body having an arcuate shape in cross section, a substantially C shape in cross section, or a substantially U shape in cross section. Accordingly, the distances from the coil 4 to the respective parts of the workpiece W1 vary depending on the positions of the workpiece W1. However, the workpiece W1 is self-heated by high-frequency induction heating. Therefore, since the whole workpiece W1 is uniformly heated, the temperature difference in the respective parts of the workpiece W1 is not so large. In other words, the temperatures of the respective parts of the workpiece W1 are uniform.

When one specific example of the coil 4 shown in FIG. 2 is used, the distances between the respective parts of the coil 4 and the workpiece W1 are substantially the same regardless of the parts of the coil 4. It is therefore possible to heat the whole workpiece W1 evenly.

The temperature of the workpiece W1 may be measured based on the current that flows through a type K thermocouple or the like that is welded to the surface of the workpiece W1 using a spot welding machine.

Next, the spray liquid L1 is sprayed onto the workpiece W1 from the nozzle 3 (spray step S2). Then the spray liquid L1 is thermally decomposed on the surface of the workpiece W1, whereby the ATO film is formed. This spraying is appropriately continued and the ATO film is grown on the surface of the workpiece W1, whereby a film is formed. The thickness of the ATO film is not particularly limited and it may be within a predetermined range (e.g., 100 nm).

From the aforementioned discussion, the ATO film can be formed on the surface of the workpiece W1. The workpiece W1 where this ATO film is manufactured can be used as a fuel cell separator. Further, by stacking a plurality of fuel cell separators, a fuel cell stacks can be formed.

Further, according to the aforementioned surface treatment method, the workpiece W1 is heated by high-frequency induction heating, whereby the workpiece W1 is self-heated. It is therefore possible to prevent the temperature unevenness of the workpiece W1.

Further, by using one specific example of the coil 4 shown in FIG. 2 in the high-frequency induction heating step S1, it is possible to heat the workpiece W1 further evenly by high-frequency induction heating. That is, it is possible to further suppress the temperature unevenness of the workpiece W1.

Example

Figure 4:
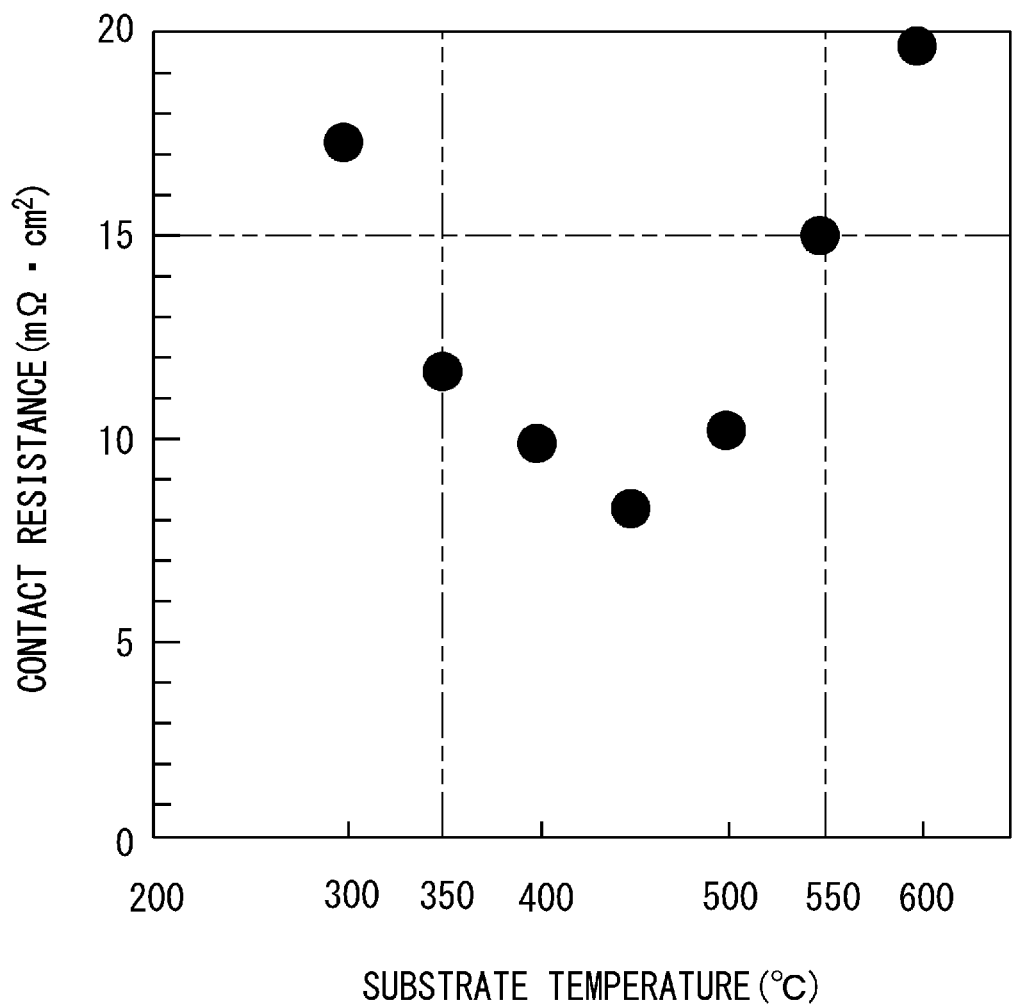
FIG. 4 is a graph showing contact resistance with respect to a substrate temperature.

Referring next to FIG. 4, an experiment performed using the surface treatment method according to the first embodiment will be explained. FIG. 4 is a graph showing contact resistance with respect to the substrate temperature.

In this Example, a pure titanium plate having a thickness of 0.1 mm was used as the workpiece W1. In the step that corresponds to the high-frequency induction heating step S1, the temperature of this pure titanium plate was set to a plurality of levels within a range from 300° C. to 600° C. After the completion of the spray step S2, the antimony concentration of the ATO film that has been formed was 3 atm % and the film thickness thereof was 100 nm.

A preliminary heating test was performed for this pure titanium plate. In this preliminary heating test, the temperature of the substrate central part and that of the substrate edge part of the titanium plate were measured and compared. It was confirmed that the temperature of the substrate central part and that of the substrate edge part were the same.

Further, contact resistance was measured for evaluating electrical conductivity. Specifically, first, a carbon paper was held between the film forming surface of the ATO film of this pure titanium plate and the gold-plated copper plate, and pressure was applied with a pressure value of 0.98 MPa. Further, when a constant current was applied between the pure titanium plate and the copper plate while applying this pressure, a voltage value between the film forming surface of the ATO film and the carbon paper was measured. Contact resistance was calculated based on the voltage value that has been measured, and the results of the calculation of the contact resistance are shown in FIG. 4. In this example, when the contact resistance was 15 m$\Omega$·cm$^2$ or smaller, it was determined that the electrical conductivity of the ATO film was good. When the contact resistance exceeded 15 m$\Omega$·cm$^2$, it was determined that the electrical conductivity of the ATO film was poor.

As shown in FIG. 4, when the substrate temperature was within a range from 350° C. or higher to 550° C. or lower, the contact resistance became equal to or smaller than 15 m$\Omega$·cm$^2$, which means that the electrical conductivity was good. On the other hand, when the substrate temperature was lower than 350° C. or exceeded 550° C., the contact resistance exceeded 15 m$\Omega$·cm$^2$, which means that the electrical conductivity was poor.

When the substrate temperature is equal to or higher than 350° C., in the step that corresponds to the high-frequency induction heating step S1, the spray liquid is thermally decomposed sufficiently on the surface of the aforementioned pure titanium plate, and the ATO film having high crystallinity is formed. When the substrate temperature is 550° C. or lower, spray liquid hardly becomes powders in the step that corresponds to the high-frequency induction heating step S1. Therefore, the ATO film is hardly dropped off from the pure titanium plate and remains. Further, this ATO film maintains a high density since it contains little gaps and voids between the particles. That is, this ATO film maintains high crystallinity.

From the above discussion, the substrate temperature is preferably within a range from 350° C. or higher to 550° C. or lower since the ATO film has high crystallinity and high electrical conductivity.

Note that the present disclosure is not limited to the aforementioned embodiment and may be changed as appropriate without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A surface treatment method of a fuel cell separator in which an antimony-doped tin oxide film (ATO film) is formed on a surface of a fuel cell separator used for a fuel cell, the method comprising:
   obtaining the fuel cell separator;
   disposing the entire fuel separator in a film forming chamber;
   reducing an oxygen partial pressure of an inner atmosphere of the film forming chamber;
   heating the fuel cell separator using a high-frequency induction heating method; and
   causing the ATO film to be formed on the surface of the fuel cell separator by spraying a solution including antimony and tin onto the fuel cell separator,
   wherein the entire fuel cell separator is heated during the heating using the high-frequency induction heating method.

2. The surface treatment method of the fuel cell separator according to claim 1, wherein, when the solution including antimony and tin is sprayed, the temperature of the fuel cell separator is within a range from 350° C. or higher to 550° C. or lower.

3. The surface treatment method of the fuel cell separator according to claim 1, wherein a high-frequency induction coil having a pancake-like shape is used for the high-frequency induction heating method.

\* \* \* \* \*